UNITED STATES PATENT OFFICE.

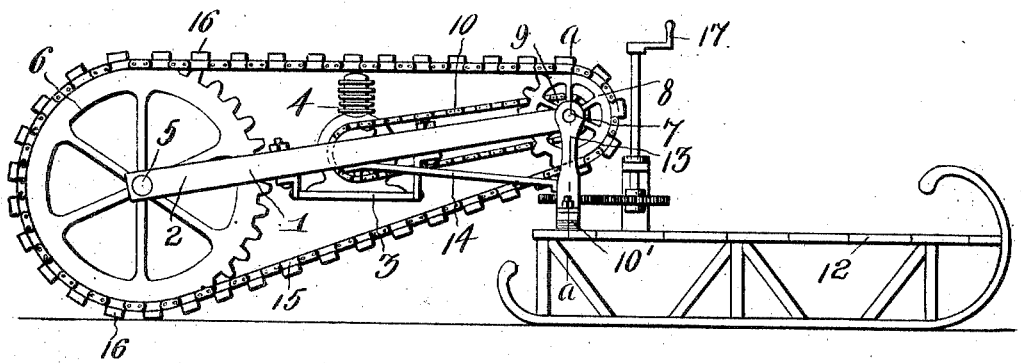
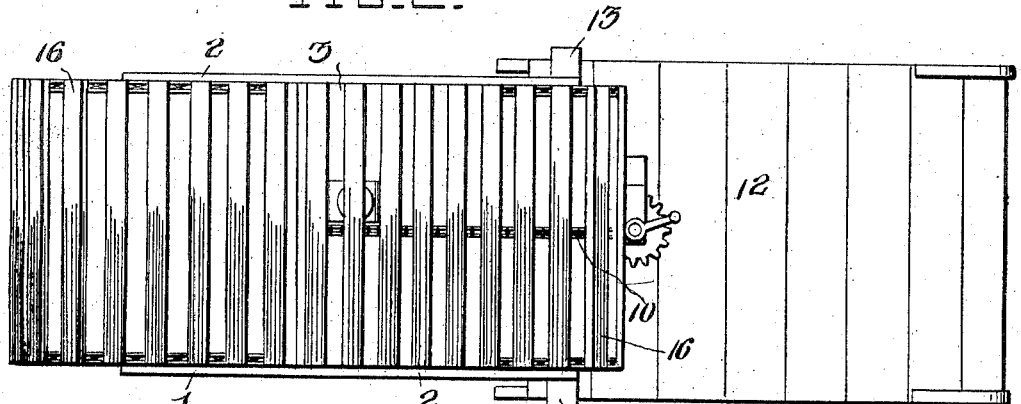
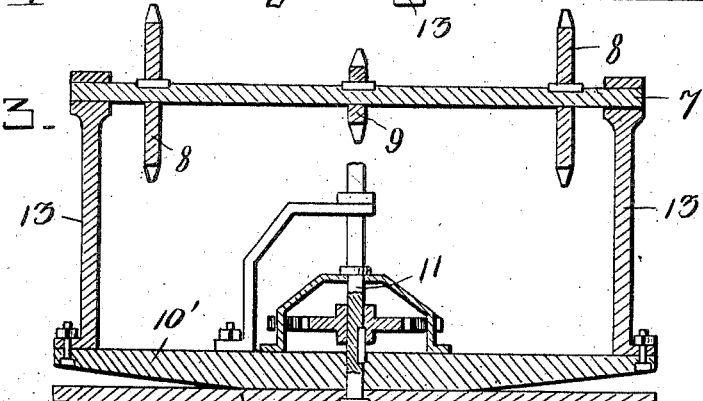

WILLIAM CICERO KING AND HERMANN ESTORFF, OF COLFAX, CALIFORNIA.

SLED-PROPELLING MECHANISM.

No. 817,071.       Specification of Letters Patent.       Patented April 3, 1906.

Application filed May 11, 1905. Serial No. 259,940.

*To all whom it may concern:*

Be it known that we, WILLIAM CICERO KING and HERMANN ESTORFF, citizens of the United States, residing at Colfax, in the county of Placer and State of California, have invented certain new and useful Improvements in Sled-Propelling Mechanisms; and we do declare the following to be a full, clear, and exact description of the invention, such as will enable others skilled in the art to which it appertains to make and use the same.

Our invention relates to improvements in propelling mechanism for sleds or other vehicles, by means of which the same may be propelled over snow, ice, or ground; and it consists in the construction, combination, and arrangement of devices hereinafter described and claimed.

In the accompanying drawings, Figure 1 is a side elevation of a propelling mechanism embodying our invention, showing the same attached to a sled for propelling the latter. Fig. 2 is a top plan view of the same. Fig. 3 is a detail transverse sectional view of the same on a plane intersecting the pivotal connection between the sled and the bolster.

The frame 1 of our improved propelling mechanism, as here shown, comprises a pair of side bars 2 and a centrally-disposed connecting-platform 3, on which is mounted a gasolene or other suitable engine 4. A shaft 5 is journaled in bearings near the rear end of the side bars 2 and is provided with sprocket-wheels 6 of suitable size. A shaft 7 is journaled in bearings near the front ends of the said side bars and is provided with similar sprocket-wheels 8 and is further provided with a sprocket-wheel 9, the said wheel 9 being engaged by the driving-sprocket chain 10 of the engine, so that the said shaft 7 is rotated by the engine. A bolster 10' is mounted, by means of a suitable pin 11 or equivalent device, across the rear portion of a sled or other suitable vehicle, such as is indicated at 12. The standards 13 of the said bolster have bearings for the said shaft 7, and braces 14 extend from the ends of the said bolster to the sides of the frame 1 to brace the latter. The wheels 6 8 of the respective shafts 5 7 are connected together by sprocket-chains 15, the said sprocket-chains being connected together by spaced traction-slats 16, which are secured to the links of the said chains. As the said traction-slats pass under the wheels 6 they bear on the surface of the snow, ice, or ground and serve to propel the sled or other vehicle, as will be understood. Our improved propelling mechanism extends to the rear of the sled or other vehicle to which it is attached, where it is out of the way, and is pivotally connected to the sled or other vehicle, so that the latter may be readily guided by means of a suitable lever 17.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described our invention, what we claim as new, and desire to secure by Letters Patent, is—

A vehicle having a pivotally-mounted element thereon to swing in a horizontal plane, a shaft having its bearings in said element and provided with sprocket-wheels, a frame extending rearwardly from said vehicle and having side bars, the front ends of which are pivoted on said shaft, supporting traction-wheels having their bearings in the rear ends of said side bars, an engine carried by the frame and connected to the shaft, to drive the latter, and an endless flexible traction element engaging and connecting the sprocket-wheels on the shaft with those at the rear of the frame.

In testimony whereof we have hereunto set our hands in presence of two subscribing witnesses.

WILLIAM CICERO KING
        HERMANN ESTORFF.

Witnesses:
   J. H. KNEELAND,
   HENRY WALES.